United States Patent [19]

Ishiwa et al.

[11] Patent Number: 5,565,515
[45] Date of Patent: Oct. 15, 1996

[54] COPOLYCARBONATE COMPOSITIONS HAVING IMPROVED SURFACE APPEARANCE

[75] Inventors: Kenichi Ishiwa, Oyama; Hideyuki Itoi, Utsunomiya, both of Japan

[73] Assignee: General Electric Company, Pittsfield, Mass.

[21] Appl. No.: 584,717

[22] Filed: Jan. 11, 1996

Related U.S. Application Data

[63] Continuation of Ser. No. 316,688, Sep. 30, 1994, abandoned.

[30] Foreign Application Priority Data

Sep. 30, 1993 [JP] Japan ..................... 5-265521

[51] Int. Cl.$^6$ ............................. C08L 69/00; C08K 7/14
[52] U.S. Cl. ...................... 524/504; 524/508; 525/67; 525/146; 525/147
[58] Field of Search ................... 524/504, 508; 525/67, 146, 147

[56] References Cited

U.S. PATENT DOCUMENTS

| | | | |
|---|---|---|---|
| 3,663,471 | 5/1972 | Schirmer | 525/67 |
| 4,172,103 | 10/1979 | Serini et al. | 525/76 |
| 5,091,461 | 2/1992 | Skochdopole | 524/493 |
| 5,336,751 | 8/1994 | Raymond | 528/204 |

FOREIGN PATENT DOCUMENTS

| | | | |
|---|---|---|---|
| 0456030 | 4/1991 | European Pat. Off. | |
| 508774 | 10/1992 | European Pat. Off. | 528/204 |
| 508775 | 10/1992 | European Pat. Off. | 528/204 |
| 78466 | 3/1993 | Japan | 528/204 |
| 78468 | 3/1993 | Japan | 528/204 |
| 1586910 | 3/1981 | United Kingdom | 525/67 |

OTHER PUBLICATIONS

Chemical Abstract 121: 302266.

*Primary Examiner*—David Buttner

[57] ABSTRACT

Improved flow copolycarbonate compositions are provided containing resorcinol repeat units and containing styrene-acrylonitrile copolymers. The compositions may additionally comprise a rubbery polymer and an inorganic filler, such as glass fibers.

14 Claims, No Drawings

COPOLYCARBONATE COMPOSITIONS HAVING IMPROVED SURFACE APPEARANCE

This is a continuation of Ser. No. 08/316,688 filed on Sep. 30, 1994 now abandoned.

The present invention pertains to thermoplastic resin composition containing a poly carbonate resin.

BACKGROUND OF THE INVENTION

Resin compositions containing polycarbonate resins and ABS resins have superior properties such as impact resistance and dimensional accuracy, and are widely used for the interiors and exteriors of automobiles and housings for office automation devices. Especially in housings for different types of devices, reduced thicknesses of the materials used is on the increase in response to the current demand for devices with reduced cost and reduced weight. In order to meet the demand described above, an improvement in the flow properties of molten resin materials is strongly needed. In the past, as a means to improve the flow properties, a method consisting of decreasing the molecular weight of matrix-type polycarbonate resins has been used, but in said method, the impact resistance of the molded product becomes inferior; therefore, it is not suitable.

Also, an attempt has been made in an effort to improve the rigidity and dimensional accuracy by mixing an inorganic filler, for example, glass fibers, with a resin composition containing a polycarbonate resin and ABS resin. The resin composition produced above is used for chassis materials, etc., for various types of office automation. Among the above-mentioned applications, in the case of applications such as base chassis that comprised the external portions of parts, superior surface appearance and good dye affinity required. However, in resin compositions comprised of polycarbonate/ABS resins, the surface smoothness is poor due to "floating" of inorganic fillers included in the resin, and it is not possible to retain a good surface appearance. As a means to improve the problem described above, an increase in the die temperature at the time of the molding process is conceivable, but the molding cycle becomes long, and it is not suitable.

The objective of the present invention is to produce a thermoplastic resin composition containing a polycarbonate-type resin with good molten flow properties and high mechanical strength.

Furthermore, the objective of the present invention is to produce a thermoplastic resin composition containing a polycarbonate type resin capable of retaining the surface appearance of the molded product, even when an inorganic filler is included as a reinforcing material, and at the same time, having good hot-melt adhesive flow properties.

SUMMARY OF THE INVENTION

The present invention is to produce a thermoplastic resin composition containing (A) a copolymer polycarbonate having the structural unit shown in the following chemical formula (I):

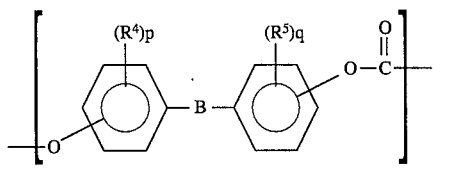

and formula (II):

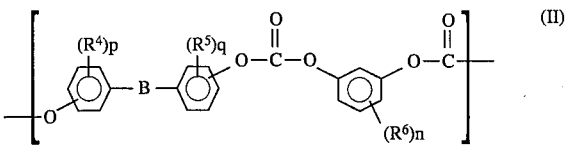

(in above-mentioned formulas, $R^4$ and $R^5$ each represent a halogen atom or monovalent hydrocarbon group, B represents —$(R^1$—$)C(\!$—$R^2)$— (in which $R^1$ and $R^2$ each represent a hydrogen atom or a monovalent hydrocarbon group), —$C(\!=\!R^3)$— (in which $R^3$ represents a divalent hydrocarbon group), —O—, —S—, —SO— or —$SO_2$—, $R^6$ represents a $C_{1-10}$ hydrocarbon group, halides thereof or a halogen atom, and p, q and n independently represent integers with values of 0–4) and the amount of the structural unit of above-mentioned formula (II) is 2–90 mol % based on the total amount of structural units of formula (I) and formula (II), and (B) b-1) a copolymer containing (a) a rubbery polymer, (b) an aromatic vinyl monomer component and (c) a cyanated vinyl monomer component as the structural components of the copolymer, and/or b-2) a copolymer containing (b) an aromatic vinyl monomer component and (c) a cyanated vinyl monomer component as the structural components of the copolymer at a ratio of (B) 99-1 parts by weight for (A) 1-99 parts by weight.

It is necessary for the copolymer polycarbonate used in the present invention to have the structural unit shown in above-mentioned formulas formula (I) and formula (II). First of all, the structural unit shown in the formula (I) is made of a diphenol component and a carbonate component. The diphenol that can be used for induction of diphenol component is shown in the following formula (III).

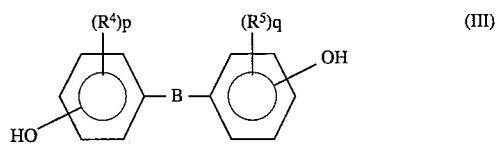

In the above-mentioned formula, the definitions of $R^4$, $R^5$, B, p and q are the same as before.

For effective diphenols that can be used in the present invention, for example, bis(hydroxyaryl)alkanes such as bis(4-hydroxyphenyl)methane, 1,1-bis(4-hydroxyphenyl)ethane, 2,2-bis(4-hydroxyphenyl)propane (so-called bisphenol A), 2,2-bis(4-hydroxyphenyl)butane, 2,2-bis(4-hydroxyphenyl)octane, bis(4-hydroxyphenyl)phenylmethane, 2,2-bis(4-hydroxy-1-methylphenyl)propane, 1,1-bis(4-hydroxy-t-butylphenyl)propane, and 2,2-bis(4-hydroxy-3-bromophenyl)propane, bis(hydroxyaryl)cycloalkanes such as 1,1-bis(4-hydroxyphenyl)cyclopentane, and 1,1-bis(4-hydroxyphenyl)cyclohexane, dihydroxyaryl ethers such as 4,4'-dihydroxydiphenyl ether, and 4,4'-dihydroxy-3,3'-dimethylphenyl ether, dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide, and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone, etc., can be mentioned, but are not limited to these. One or a combination of two or more of these materials can be used. Among those described above, 2,2-bis(4-hydroxyphenyl)propane is further desirable.

Also, for the precursor material used upon induction of the carbonate component, for example, dicarbonates such as diphenyl carbonate, ditolyl carbonate, bis(chlorophenyl) carbonate, m-cresyl carbonate, dinaphthyl carbonate, bis-(diphenyl) carbonate, diethyl carbonate, dimethyl carbonate, dibutyl carbonate and dicyclohexyl carbonate and halogenated carbonyl compounds such as phosgene can be mentioned. One or a combination of two or more of these materials may be used. Diphenyl carbonate is especially desirable.

Also, the structural unit shown in above mentioned formula (II) is made of a diphenol component, a resorcinol and/or substituted resorcinol component and a polycarbonate component. Upon induction of the diphenol component, above mentioned diphenols can be used. Also, for the carbonate components, the above mentioned dicarbonates or phosgene can be used. In order to introduce the resorcinol and/or substituted resorcinol component, one or a combination of two or more of the compounds shown in the following formula formula (IV):

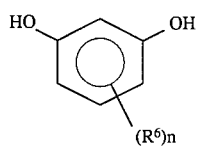

(IV)

(in which the definition of $R^6$ and n are the same as above). For said compounds, for example, resorcinol, and substituted resorcinols such as 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol, and 2,3,4,6-tetrabromoresorcinol, etc., can be mentioned. Among those described above, resorcinol is further desirable.

The copolymer polycarbonate of the component (A) includes the above mentioned two types of structural units shown in formula (I) and formula (II) at a ratio described below. That is, the ratio of the structural unit shown in formula (III) is 2–90 mol %, preferably 2–40 mol %, based on the total amount of formula (I) and formula (III). When the ratio of formula (III) is less than 2 mol %, the decrease in the glass transition temperature (Tg) is inadequate, and an improvement in the flow properties cannot be achieved. On the other hand, when the ratio is greater than 90 mol %, superior properties such as high mechanical strength and heat resistance equal to those of conventional polycarbonate cannot be achieved.

In general, the weight-average molecular weight of the copolymer polycarbonate of the component (A) is 10,000–100,000, preferably, 18,000–40,000. The weight-average molecular weight in this case is measured by GPC (gel permeation chromatography) with a polystyrene corrected for polycarbonate. (Also, it is desirable to use those with an intrinsic viscosity of 0.35–0.65 dL/g measured in methylene chloride at 25° C.)

The copolymer polycarbonate of the component (A) can be produced by a known manufacturing method used for polycarbonates, for example, the interfacial polymerization method using phosgene or a molten polymerization method can be used. It is especially desirable from the standpoint of environmental health when the molten polymerization method is used since toxic substances such as phosgene and methylene chloride are not used.

The conditions such as temperature and pressure used at the time of the molten polymerization reaction are not limited, and standard conditions commonly used can be used. In specific terms, a reaction is carried out with a diphenol, the compound shown in above mentioned formula, formula (IV) and a dicarbonate at a temperature of 80°–250° C., preferably, 100°–230° C., and especially 120°–190° C. for 0–5 h, preferably 0–4 h, and especially 0–3 h under an ambient pressure. Subsequently, the pressure in the reaction system is reduced, the reaction temperature is increased, and a reaction is carried out with a diphenol, the compound shown in above mentioned formula formula (IV) and a dicarbonate; then the final reaction is carried out with a diphenol, the compound shown in above mentioned formula formula (IV) and a dicarbonate under a reduced pressure of 5 mm Hg or less, preferably 1 mm Hg or less, at a temperature of 240°–320° C.

The above mentioned polycondensation reaction may be performed either by the continuous system or the batch system. Furthermore, the reaction device used upon performing the above mentioned reaction may be a tank-type, tube-type or column-type reactor.

Also, according to the molten polymerization method, when greater than 90 mol % of the structural unit shown in the formula (II) is used based on the total amount of formula (I) and formula (II) in the copolymer polycarbonate produced is used, that is, when greater than 90 mol of resorcinol and/or substituted resorcinol is used for 100 mol of diphenol, it is possible to produce a copolymer polycarbonate with a hue, moisture resistance and heat resistance that are to superior those obtained with other methods, for example, the interfacial polymerization method.

Also, when the end of the copolymer polycarbonate of the component (A) is a phenol, an adequate impact resistance is achieved, but when an end group with a higher bulk such as p-t-butylphenol, isononylphenol, isooctylphenol, m- or p-cumylphenol (preferably, p-cumylphenol), and chromanyl compounds for example, chroman is introduced, it is possible to produce a copolymer polycarbonate with a superior low-temperature impact resistance.

In the following, component (B) is explained. The component (B) is b-1) and/or b-2). First of all, b-1) is a copolymer containing rubbery polymer (a), aromatic vinyl monomer component (b), and cyanated vinyl monomer component (c).

For the rubbery polymer (a) that can be used in the present invention, diene-type rubbers such as polybutadiene, polyisoprene, styrene-butadiene random and block copolymers, hydrogenated block copolymers thereof, acrylonitrile-butadiene copolymer, and butadiene-isoprene block copolymer, acrylic elastic polymers such as ethylene-propylene random and block copolymers, ethylene-butene random or block copolymers, ethylene and α-olefin copolymers, copolymers of ethylene and unsaturated carboxylate, for example, ethylene-methacrylate, ethylene-butylacrylate, etc., acrylate-butadiene copolymer, for example, butylacrylate-butadiene, copolymers of ethylene and fatty acid vinyl for example, ethylene-vinyl acetate, ethylene-propylene nonconjugated diene terpolymers such as ethylene-propylene-ethylidenenorbornane copolymer and ethylene-propylene-hexadiene copolymer, butylene-isoprene copolymer, chlorinated polyethylene, etc., can be mentioned, and one or a combination of two more of these may be used. For a desirable rubbery polymer, ethylene-propylene rubber, ethylene-propylene nonconjugated diene terpolymer, diene-type and acrylic-type elastic polymers can be mentioned, and polybutadiene and styrene-butadiene copolymer are further desirable, and it is desirable for the styrene content in the styrene-butadiene copolymer to be 50% or less.

For the cyanated vinyl monomer component (b) used in the present invention, for example, acrylonitrile, methacrylonitrile, etc., can be mentioned, and one or a combination of two more of these can be used.

For the aromatic vinyl monomer component (c) used in the present invention, for example, styrene, α-methylstyrene, o-, m- or p-methylstyrene, vinylxylene, monochlorostyrene, dichlorostyrene, monobromostyrene, dibromostyrene, fluorostyrene, p-tert-butylstyrene, ethylstyrene, vinylnaphthalene, etc., can be mentioned, and one or a combination of two or more of these may be used. Styrene and α-methylstyrene are further desirable.

In b-1) of the component (B) of the present invention, in addition to above mentioned components (a), (b) and (c), a monomer (d) that is copolymerizable with these components can be further included in an amount that does not interfere with the objective of the present invention. For said copolymerizable monomers, α,β-unsaturated carboxylic acids such as acrylic acid and methacrylic acid, α,β-unsaturated carboxylates such as methyl (meth)acrylate, ethyl (meth)acrylate, propyl (meth)acrylate, butyl (meth)acrylate, 2-ethyl (meth)acrylate, and 2-ethylhexyl methacrylate, α-β-unsaturated dicarboxylic acid anhydrides such as maleic anhydride and itaconic anhydride, and α,β-unsaturated dicarboxylic acid imides such as maleimide, N-methylmaleimide, N-ethylmaleimide, N-phenylmaleimide, N-o-chlorophenylmaleimide, etc., can be mentioned, and one or a combination of two or more of these monomers may be used.

In component b-1), the composition ratio of each component (a), (b) and (c) is not especially limited, and each can be mixed according to the application purpose.

For the copolymer of component b-1), graft copolymers, in which different components are graft copolymerized in the presence of the rubbery polymer (a), and resins such as ABS resins (acrylonitrile-butadiene-styrene copolymer), AES resin (acrylonitrile-ethylene-propylene-styrene copolymer), ACS resin (acrylonitrile-chlorinated polyethylene-styrene copolymer), and AAS resin (acrylonitrile-acrylic acid copolymer-styrene copolymer) can be mentioned.

The manufacturing method of the copolymer of the component b-1) is not especially limited, and conventional polymerization methods, such as solid polymerization, solution polymerization solid suspension polymerization, suspension polymerization and emulsion polymerization, can be mentioned. Also, it is possible to produce component b-1) by blending resins that are copolymerized separately.

Secondly, b-2) of component (B) is a copolymer containing aromatic vinyl monomer component (b) and cyanated vinyl monomer component (c). For specific examples of these components, those shown as (b) and (c) in the above mentioned b-1) can be used, and the composition ratios of these materials are not especially limited and are selected according to the application purpose. For a desirable b-2), SAN resin (styrene-acrylonitrile copolymer) can be mentioned. Also, for the manufacturing method of the copolymer of component b-2), the method described for the above mentioned b-1) can also be used.

For a desirable component (B), a blend of the graft copolymer in which different components are grafted in the presence of rubbery polymer (a) and the copolymer of b-2) can be mentioned.

The mixing ratio of the above mentioned components (A) and (B) is 99-1 parts by weight of (B) for 1-99 parts by weight of (A), and 90-5 parts by weight of (B) for 10-95 parts by weight of (A) is further desirable.

The second objective of the present invention is to produce a thermoplastic resin composition containing an inorganic filler, in which less than 200 parts by weight of inorganic filler for 100 parts by weight of the sum of above mentioned component (A) and (B) is included. When the mixing ratio of the inorganic filler is greater than 200 parts by weight, the flow properties become inferior.

The inorganic fillers that can be used in the present invention not especially limited, and any conventional inorganic fillers can be used. Specifically, glass fibers, glass flakes, glass beads, milled glass, talc, clay, mica, carbon fibers, wollastonite, potassium titanate whiskers, titanium oxide, zinc oxide whiskers, etc. can be mentioned.

In addition to above mentioned components, various types of common additives, for example, pigments, dyes, heat-resisting agents, antioxidants, weather-resisting agents, lubricants, release agents, plasticizers, flame retardants, fluidity modifiers, antistatic agents, etc., can be added at the time of mixing or molding of the resins in the resin compositions of the present invention, as needed.

The manufacturing method of the resin composition of the present invention is not especially limited and standard methods can be used effectively. However, in general, the hot-melt adhesive mixing method is desirable. It is possible to use a small amount of solvent, but in general, it is not needed. For the mixing device, extruders, Banbury mixers, rollers and kneaders, etc., can be mentioned, and these are operated continuously or in batch system. The mixing order of these components are not especially limited.

APPLICATION EXAMPLES

In the following, the present invention is further explained in detail with application examples. In the application examples, the following compositions are used for each component.

Component (A)

RS-PC: copolymer polycarbonate produced by the method described below:

0.22 kmol of bisphenol A (product of Japan G.E. Plastics Co., Ltd.), 0.22 kmol of resorcinol, and 0.44 kmol of diphenyl carbonate (product of Eni Co.) were charged in a first tank-type mixer (capacity 250 L), and melting was performed at 140° C. The mixture produced was transferred to the second tank-type mixer (capacity 50 L) at a rate of 0.16 kmol/h in the form of bisphenol A while the temperature was maintained at the above mentioned temperature. The temperature in the second tank-type mixer was retained at 180° C.

To the mixture described above, tetramethylammonium hydroxide at a rate of 0.04 mol/h and sodium hydroxide at a rate of 0.00016 mol ($1 \times 10^{-6}$ mol/mol bisphenol A)/h were added as catalysts, the time was adjusted to achieve a retention time of 30 min, and the mixture was stirred.

Then, above-mentioned reaction solution was transferred to the third tank-type mixer (capacity 50 L) at a rate of 0.16 kmol per h as bisphenol A. The temperature of the third tank-type mixer was 210° C. and the pressure was 200 mm Hg. The time was adjusted to achieve the retention time of 30 min, and the mixture was stirred as it was distilled to remove the phenol.

Then, the above mentioned reaction solution was transferred to the fourth tank-type mixer (capacity 50 L) at a rate of 0.16 kmol/h bisphenol A. The temperature of the third tank-type mixer was 240° C. and the pressure was 15 mm Hg. The time was adjusted to achieve a retention time of 30 min, and the mixture was stirred as it was distilled to remove of the phenol. The limiting viscosity [η] of the reaction product produced after the reaction reached the normal state was 0.15 dL/g.

Then, the pressure for the reaction product was increased using a gear pump, and the reaction product was transferred to a centrifugal thin-film evaporator at a rate of 0.16 kmol/h as bisphenol A, and the reaction was promoted. The temperature and the pressure of the thin-film evaporator used were 270° C. and 2 mm Hg, respectively. The reaction product was supplied to a biaxial horizontal polymerization stirring tank (L/D=3, diameter of the stirring rotating blade 220 mm, internal capacity 80 L), the temperature and the pressure of which have been controlled at 290° C, and 0.2 mm Hg, respectively, at a rate of 0.16 kmol/h (approximately 40 kg/h) as bisphenol A from the lower portion of the evaporator by a gear pump, and polymerization was carried out with a retention time of 30 min. The limiting viscosity [η] of the reaction product at this time was 0.49 dL/g. The reaction product produced was a copolymer polycarbonate containing the components shown in formulas (V) and (VI) at a molar ratio of 50:50. In the following, these are abbreviated as RS-PC.

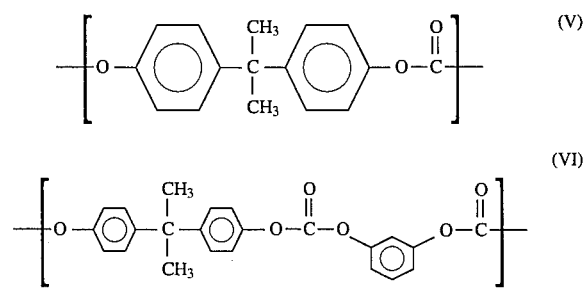

PC-1: Polycarbonate of bisphenol A used for comparison, product name Lexan (produced by Japan G.E. Plastics Co., Ltd.), intrinsic viscosity measured at 25° C. in methylene chloride of 0.48 dL/g.

PC-2: Polycarbonate of bisphenol A used for comparison, product name Lexan (produced by Japan G.E. Plastics Co., Ltd.), intrinsic viscosity measured at 25° C. in methylene chloride of 0.38 dL/g.

Component (B)

b-1: ABS resin, product name UX 050 (product of Ube Cycon Co., Ltd.)
b-2: SAN resin, product name SR 30B (product of Ube Cycon Co., Ltd.)

Inorganic Filler

Glass fiber, product name FT 116 (product of Asahi Fiber Glass Co., Ltd.)

Application Example 1 and Comparative Examples 1–2

Each component was mixed at a ratio (weight ratio) shown in Table I, and extruded from a biaxial extruder (30 mm) set at 260° C., 150 rpm, and 15 kg/h (extrusion rate) and pellets were produced. The melt index (MI) of each resin composition was measured at a temperature of 260° C., and a pressure of 5 kg [sic] as specified in ASTM D790. Then, the pellet was injection molded by an 80-tonne molding machine at a set temperature of 260° C. and a die temperature of 80° C. The Izod impact strength and heat distortion temperature (HDT) were measured for the molded products produced. The results are shown in Table I.

It should be noted that Izod impact test was measured according to the method specified in ASTM D256, and the Izod impact strength with a ⅛-in notch was measured. Also, the heat decomposition temperature was measured according to the method specified by ASTM D648 under a weight of 18.6 kg.

TABLE I

|  | Application Example | Comparative Example | Comparative Example |
|---|---|---|---|
| Component (parts by weight) |  |  |  |
| RS - PC | 50 | — | — |
| PC - 1 | — | 50 | — |
| PC - 2 | — | — | 50 |
| ABS Resin | 25 | 25 | 25 |
| SAN Resin | 25 | 25 | 25 |
| Ml (g/10 min) | 18.0 | 7.2 | 16.0 |
| Izod with notch impact strength (kg-cm/cm) | 60 | 60 | 18 |
| HDT (°C.) | 100 | 104 | 104 |

Application Examples 2–3 and Comparative Examples 3–5

The components shown in Table II were extruded under the same conditions described in Application Example 1, and pellets were produced. Injection molding was carried out and molded products were produced. The same test was carried out for the resin compositions, and molded products were produced as in Application Example 1. Furthermore, the surface appearance of the molded products was evaluated. The results are shown in Table II.

The surface appearance was evaluated by measuring the glossiness at 60° and the degree of surface roughness. The surface roughness was measured by using a surface roughness tester (a universal surface tester with a surface information processor, Model SE-3H, product of Kosaka Research (Ltd.)), and the maximum height (R-max), 10 point average roughness (R-z), and the center line average height (R-a) were obtained according to the method defined in JIS B0601. The distance measured was 2.5 mm, and average value for three evaluations was used. Lower values denote smoother surfaces.

TABLE II

|  | Application Example | Comparative Example | Comparative Example | Application Example | Comparative Example |
|---|---|---|---|---|---|
| Components (parts by weight) |  |  |  |  |  |
| RS - PC | 40 | 0 | 0 | 40 | 0 |
| PC - 1 | 0 | 40 | 0 | 0 | 40 |

TABLE II-continued

|  | Application Example | Comparative Example | Comparative Example | Application Example | Comparative Example |
|---|---|---|---|---|---|
| PC - 2 | 0 | 0 | 40 | 0 | 0 |
| ABS Resin | 20 | 20 | 20 | 0 | 0 |
| SAN Resin | 20 | 20 | 20 | 40 | 40 |
| Glass fiber | 20 | 20 | 20 | 20 | 20 |
| MI (g/10 min) | 7.5 | 4.5 | 7.2 | 40 | 21 |
| Izod with notch Impact strength (kg-cm/cm) | 18 | 15 | 14 | 10 | 9 |
| HDT (°C.) | 120 | 125 | 125 | 120 | 125 |
| Surface appearance: |  |  |  |  |  |
| Glossiness | 74 | 48 | 52 | 78 | 54 |
| Surface roughness: |  |  |  |  |  |
| R-max ($\mu$m) | 3.0 | 9.8 | 8.2 | 2.8 | 7.8 |
| R-z ($\mu$m) | 2.3 | 6.2 | 6.0 | 2.1 | 5.8 |
| R-a ($\mu$m) | 0.3 | 1.2 | 1.1 | 0.3 | 1.0 |

Effect of the Invention

According to the method of the present invention, it is possible to produce a thermoplastic resin composition with an improved hot-melt adhesive flow properties as high impact resistance is retained. Furthermore, in the resin composition of the present invention containing an inorganic filler, it is possible to further improve the surface appearance. As a result, the resin composition of the present invention can be used in a wide range of applications, and is highly regarded for industrial application.

We claim:

1. A resin composition comprising:
(A) a copolymer polycarbonate comprising structural units of formula (I):

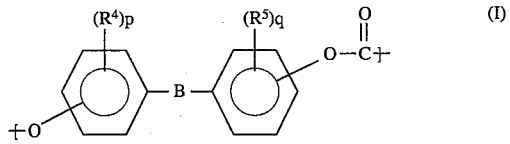

and of formula (II):

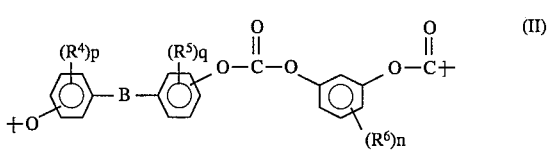

wherein B is selected from the group consisting of

—(R$_1$)C(R$^2$)—, —C(=R$^3$), —O—, —S—, —S(O)— and —SO$_2$—;

wherein R$^1$ and R$^2$ independently are a hydrogen atom or a monovalent hydrocarbon group; R$^3$ represents a divalent hydrocarbon group; R$^4$ and R$^5$ are independently a hydrogen atom or a monovalent hydrocarbon group; R$^6$ is a C$_{1-10}$ hydrocarbon group, halide, or halogen; and p, q and n independently are 0–4; and (B) a copolymer comprising:
(i) an aromatic vinyl monomer;
(ii) a cyanated vinyl monomer;
(iii) optionally, a rubbery polymer; and
(C) at least one inorganic filler;
wherein the inorganic filler comprises glass fiber; wherein the amount of formula (II) is 2–40 mole percent based on the total amount of structural units of formula (I) and formula (II); and wherein the surface roughness maximum height of the resin composition is less than about 7.8 microns.

2. The composition of claim 1, wherein (B) comprises a mixture of a copolymer of (i) and (ii) and a copolymer of (i), (ii) and (iii).

3. The composition of claim 2, wherein the copolymer of (i), (ii) and (iii) comprises (acrylonitrile-butadiene-styrene copolymer), acrylonitrile-ethylene-propylene-styrene copolymer, acrylonitrile-chlorinated polyethylene-styrene copolymer and acrylonitrile-acrylic acid copolymer-styrene copolymer.

4. The composition of claim 3, wherein the copolymer of (i) and (ii) comprises a styrene-acrylonitrile copolymer.

5. The composition of claim 1, wherein the weight ratio of the inorganic filler to the sum of (A) and (B) is less than 2 to 1.

6. The composition of claim 1, wherein formula (I) is derived from 2,2-(4-hydroxyphenyl)propane.

7. The composition of claim 6, wherein formula (II) comprises structural units of

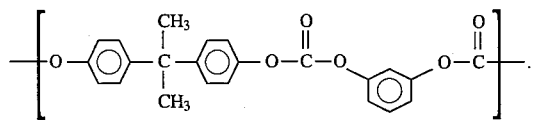

8. The composition of claim 1, wherein (B) further comprises at least one monomer of the group consisting of an a,b-unsaturated carboxylic acid, an a,b-unsaturated carboxylate, an a,b-unsaturated dicarboxylic acid anhydride, an a,b-unsaturated dicarboxylic acid imide, or a mixture of the foregoing.

9. The composition of claim 1, wherein the melt index of a composition comprising both formula (I) and formula (II) as (A) is at least 10 percent greater than the melt index of a composition comprising only formula (I) as (A).

10. The resin composition of claim 1 wherein the surface roughness maximum height of the resin composition is less than about 3 micron.

11. The resin composition of claim 1, wherein the surface glossiness is at least about 1.44 times higher that the same composition wherein component (A) is a homopolycarbonate of formula (I).

12. A resin composition consisting essentially of:
(A) a copolymer polycarbonate comprising structural units of formula (I)

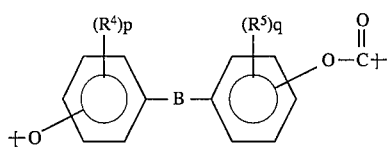

and of formula (II)

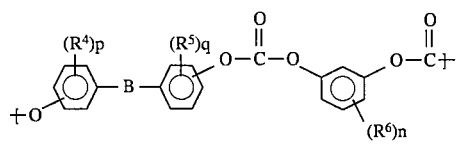

wherein B is selected from the group consisting of

—(R¹)C(R²)—, —C(=R³), —O—, —S—, —S(O)— and —SO₂—;

wherein $R^1$ and $R^2$ independently are a hydrogen atom or a monovalent hydrocarbon group; $R^3$ represents a divalent hydrocarbon group; $R^4$ and $R^5$ are independently a hydrogen atom or a monovalent hydrocarbon group; $R^6$ is a $C_{1-10}$ hydrocarbon group, halide, or halogen; and p, q and n independently are 0–4; and (B) a copolymer comprising:
(i) an aromatic vinyl monomer;
(ii) a cyanated vinyl monomer; and
(iii) optionally, a rubbery polymer; and (C) at least one inorganic filler;

wherein the inorganic filler comprises glass fiber; wherein the amount of formula (II) is 2–40 mole percent based on the total amount of structural units of formula (I) and formula (II); and wherein the surface roughness maximum height of the resin composition is less than about 7.8 microns.

13. The composition of claim 12 wherein formula (I) comprises structural units of

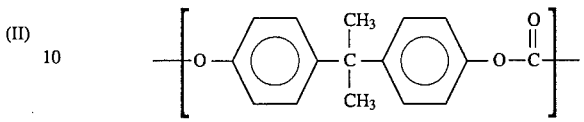

and formula (II) comprises structural units of

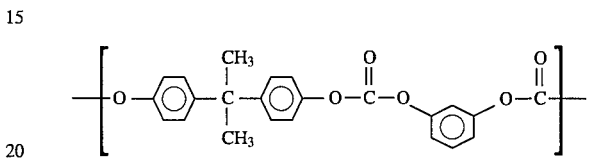

14. The composition of claim 13, wherein (B) is a styrene-acrylonitrile copolymer and optionally, further comprises at least one polymer selected from the group consisting of acrylonitrile-butadiene-styrene copolymer, acrylonitrile-ethylene-propylene-styrene copolymer, acrylonitrile-chlorinated polyethylene-styrene copolymer, and acrylonitrile-acrylic acid copolymer-styrene copolymer.

* * * * *